(12) United States Patent
Kaliomaki et al.

(10) Patent No.: US 9,126,470 B2
(45) Date of Patent: Sep. 8, 2015

(54) DOOR ASSEMBLY WITH CARRIER WITH INTRUSION MEMBER

(75) Inventors: Eric V. Kaliomaki, Ontario (CA); Raymond Edward Fortin, Ontario (CA); James J. Ferri, Ontario (CA)

(73) Assignee: Magna Closures Inc., Newmarket, Ontario (CA)

( * ) Notice: Subject to any disclaimer, the term of this patent is extended or adjusted under 35 U.S.C. 154(b) by 0 days.

(21) Appl. No.: 14/114,293

(22) PCT Filed: Apr. 30, 2012

(86) PCT No.: PCT/CA2012/050276
§ 371 (c)(1),
(2), (4) Date: Jan. 20, 2014

(87) PCT Pub. No.: WO2012/145849
PCT Pub. Date: Nov. 1, 2012

(65) Prior Publication Data
US 2014/0125087 A1    May 8, 2014

Related U.S. Application Data

(60) Provisional application No. 61/479,908, filed on Apr. 28, 2011.

(51) Int. Cl.
*B60J 5/04* (2006.01)

(52) U.S. Cl.
CPC .............. *B60J 5/0455* (2013.01); *B60J 5/0416* (2013.01); *B60J 5/0431* (2013.01); *B60J 5/0433* (2013.01); *B60J 5/0443* (2013.01); *B60J 5/0452* (2013.01)

(58) Field of Classification Search
CPC .......... B60J 5/04; B60J 5/0412; B60J 5/0413; B60J 5/0415; B60J 5/0416; B60J 5/0422; B60J 5/0423; B60J 5/0425; B60J 5/0431; B60J 5/0433; B60J 5/0437; B60J 5/042; B60J 5/0438; B60J 5/0443–5/0445; B60J 5/0448; B60J 5/045; B60J 5/0452; B60J 5/0454
USPC ............................... 296/187.12, 146.5, 146.6
See application file for complete search history.

(56) References Cited

U.S. PATENT DOCUMENTS 3,868,796 A    3/1975 Bush
4,648,208 A    3/1987 Baldamus et al.
(Continued)

FOREIGN PATENT DOCUMENTS

DE    19519509 A1    5/1995
DE    19519509 A1    12/1995
(Continued)

OTHER PUBLICATIONS

Supplementary European Search Report dated Jul. 28, 2014.
(Continued)

*Primary Examiner* — Gregory Blankenship
(74) *Attorney, Agent, or Firm* — Dickinson Wright PLLC

(57) ABSTRACT

In an aspect, the invention is directed to a door assembly for a vehicle, that includes an outer panel, an inner panel and a carrier/intrusion member assembly. The outer panel and the inner panel are connected together to form a door panel structure, and together define a door cavity. The carrier/intrusion member assembly includes a carrier and an intrusion member connected to the carrier and mounted to the door panel structure. The carrier/intrusion member assembly further includes a plurality of door hardware components mounted to at least one of the carrier and the intrusion member. The hardware components extend into the door cavity.

21 Claims, 13 Drawing Sheets

(56) References Cited

U.S. PATENT DOCUMENTS

| | | | |
|---|---|---|---|
| 4,800,638 A * | 1/1989 | Herringshaw et al. | 29/407.1 |
| 5,306,066 A * | 4/1994 | Saathoff | 296/146.6 |
| 5,536,060 A * | 7/1996 | Rashid et al. | 296/146.6 |
| 5,647,631 A * | 7/1997 | Lee | 296/146.6 |
| 6,164,716 A * | 12/2000 | Palazzolo et al. | 296/187.12 |
| 6,196,619 B1 * | 3/2001 | Townsend et al. | 296/146.6 |
| 6,663,166 B2 * | 12/2003 | Achleitner | 296/146.6 |
| 6,719,355 B2 * | 4/2004 | Ornig et al. | 296/146.5 |
| 6,779,830 B2 | 8/2004 | Patberg et al. | |
| 6,805,397 B1 * | 10/2004 | Chernoff et al. | 296/146.2 |
| 6,923,492 B2 | 8/2005 | Okazaki et al. | |
| 6,942,281 B2 * | 9/2005 | Omori et al. | 296/187.1 |
| 7,014,249 B2 | 3/2006 | Karuppaswamy et al. | |
| 7,040,688 B2 * | 5/2006 | White et al. | 296/146.6 |
| 7,059,657 B2 * | 6/2006 | Bodin et al. | 296/146.6 |
| 7,124,541 B2 * | 10/2006 | Fellner | 49/502 |
| 7,300,097 B2 * | 11/2007 | Nakagawa | 296/146.6 |
| 7,347,486 B2 * | 3/2008 | Uchida et al. | 296/187.03 |
| 7,401,842 B2 * | 7/2008 | Nakashita et al. | 296/146.6 |
| 7,607,716 B2 * | 10/2009 | Buchta et al. | 296/146.6 |
| 7,766,414 B2 * | 8/2010 | Krajewski et al. | 296/146.6 |
| 7,774,925 B2 * | 8/2010 | Tewari et al. | 29/611 |
| 7,819,462 B1 | 10/2010 | Owens | |
| 8,033,592 B2 * | 10/2011 | Hsu et al. | 296/146.6 |
| 8,091,286 B2 * | 1/2012 | Totani et al. | 49/502 |
| 8,136,866 B2 | 3/2012 | Broadhead | |
| 8,215,706 B2 * | 7/2012 | Ohta et al. | 296/187.12 |
| 8,371,639 B2 * | 2/2013 | Danaj et al. | 296/146.6 |
| 8,419,111 B2 * | 4/2013 | Uchida et al. | 296/187.03 |
| 8,602,483 B2 * | 12/2013 | Svedberg et al. | 296/146.6 |
| 8,727,420 B2 * | 5/2014 | Yasuhara et al. | 296/146.6 |
| 8,763,708 B2 * | 7/2014 | Travis et al. | 166/382 |
| 8,857,891 B2 * | 10/2014 | Jeon | 296/146.6 |
| 2014/0125087 A1 * | 5/2014 | Kalliomaki et al. | 296/146.6 |

FOREIGN PATENT DOCUMENTS

| | | |
|---|---|---|
| DE | 102008050265 A1 | 4/2010 |
| EP | 1275540 A2 | 7/2002 |
| EP | 1275540 A2 | 1/2003 |
| WO | WO 03037669 A1 | 5/2003 |
| WO | 2007111878 A2 | 10/2007 |
| WO | WO 2007127980 A1 | 11/2007 |
| WO | WO 2007131332 A1 | 11/2007 |

OTHER PUBLICATIONS

Design Optimization Case Study: Car Structures by Mark Carruth of University of Cambridge.

* cited by examiner

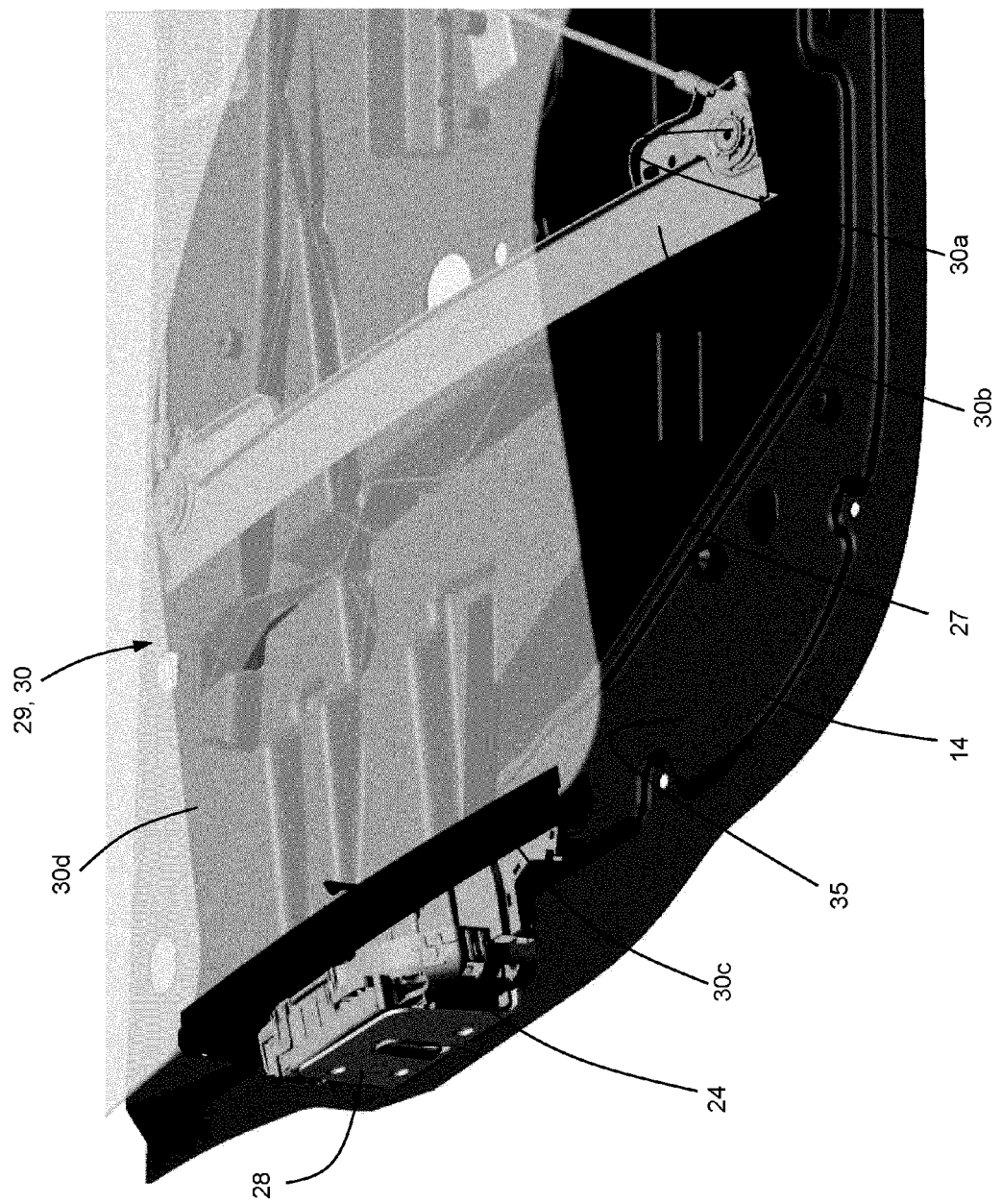

DOOR ASSEMBLY WITH CARRIER WITH INTRUSION MEMBER

FIELD OF THE INVENTION

The invention relates to vehicle door assemblies with intrusion members to protect vehicle occupants against side impacts, and with carriers for holding door hardware components.

BACKGROUND OF THE INVENTION

The automotive industry continuously seeks to better protect pedestrians from collisions with other vehicles. In particular, some attention has been paid to preventing occupant injury during side impacts, since there is relatively little structure in vehicle doors that is available to protect vehicle occupants, as compared to the safety structure present during frontal or rear-end collisions. In recent years, the use of side impact beams, also known as intrusion beams, has become more common. However, these beams in at least some instances have made more complicated the process of manufacturing vehicle door assemblies. In such cases, the intrusion beam extends across the opening that is used to mount the carrier to the inner door panel, and thus can interfere with the mounting of the carrier.

There is therefore a need to provide a door assembly that provides good occupant protection while also being easy to manufacture.

SUMMARY OF THE INVENTION

In an aspect, the invention is directed to a door assembly for a vehicle, that includes an outer panel, an inner panel and a carrier/intrusion member assembly. The outer panel and the inner panel are connected together to form a door panel structure, and together define a door cavity. The carrier/intrusion member assembly includes a carrier and an intrusion member connected to the carrier and mounted to the door panel structure. The carrier/intrusion member assembly further includes a plurality of door hardware components mounted to at least one of the carrier and the intrusion member. The hardware components extend into the door cavity.

By providing the intrusion member and carrier together as an assembly, the assembly can be mounted to the door panel structure relatively easily because the installer does not need to maneuver the carrier and the door hardware components mounted thereto around a preexisting intrusion member that blocks an aperture into the door cavity, as is the case with some door assemblies of the prior art.

In another aspect, the invention is directed to a carrier/intrusion member assembly that includes a carrier and an intrusion member connected to the carrier. The intrusion member further has a first end and a second end and includes a first mounting feature at the first end and a second mounting feature at the second end. The first and second mounting structures are positioned for use in mounting the intrusion member with a door panel structure. The carrier/intrusion member assembly further includes a plurality of window regulator components mounted to the carrier.

In yet another aspect, the invention is directed to a carrier/intrusion member assembly that includes a carrier and an intrusion member connected to the carrier. The intrusion member and the carrier together define a carrier/intrusion member cavity. A plurality of door hardware components mounted to at least one of the carrier and the intrusion member.

In yet another aspect, the invention is directed to a method of making a door assembly, comprising:

a) providing a door panel structure including an outer panel and an inner panel connected together and together defining a door cavity between the inner and outer panels;

b) providing a carrier/intrusion member assembly including a carrier, an intrusion member connected to the carrier, and a plurality of door hardware components mounted to at least one of the carrier and the intrusion member; and c) mounting the carrier/intrusion member assembly to the door panel structure at least in part by mounting the intrusion member to the door panel structure, wherein after step c) the hardware components extend into the door cavity.

BRIEF DESCRIPTION OF THE DRAWINGS

The present invention will now be described by way of example only with reference to the attached drawings, in which:

FIG. 5*a* is a perspective view of a portion of the door assembly shown in FIG. 2;

FIG. 8 is an end view of the carrier/intrusion member assembly shown in

FIG. 7, showing the optional use of an energy absorption member;

DETAILED DESCRIPTION OF PREFERRED EMBODIMENTS

Figure 1:
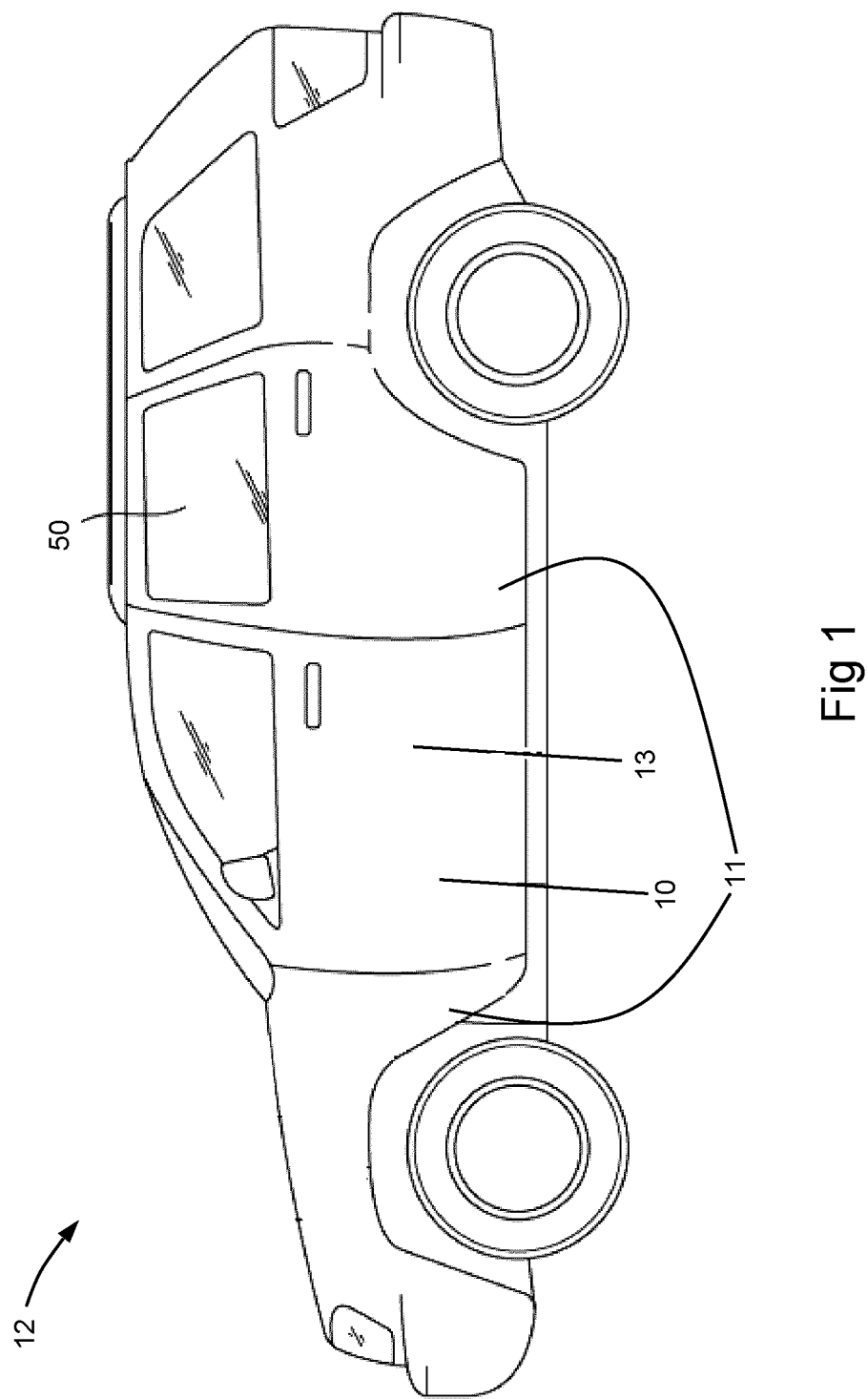
FIG. 1 is a perspective view of a vehicle with a door assembly in accordance with an embodiment of the present invention.

Reference is made to FIG. 1, which shows a door assembly 10 in accordance with an embodiment of the present invention, mounted to a body 11 of a vehicle 12. The door assembly 10 includes an outer panel 13, an inner panel 14 (FIG. 2), and a carrier/intrusion member assembly 16. The production of the door assembly 10 is facilitated directly as a result of the carrier/intrusion member assembly 16.

Figure 3:
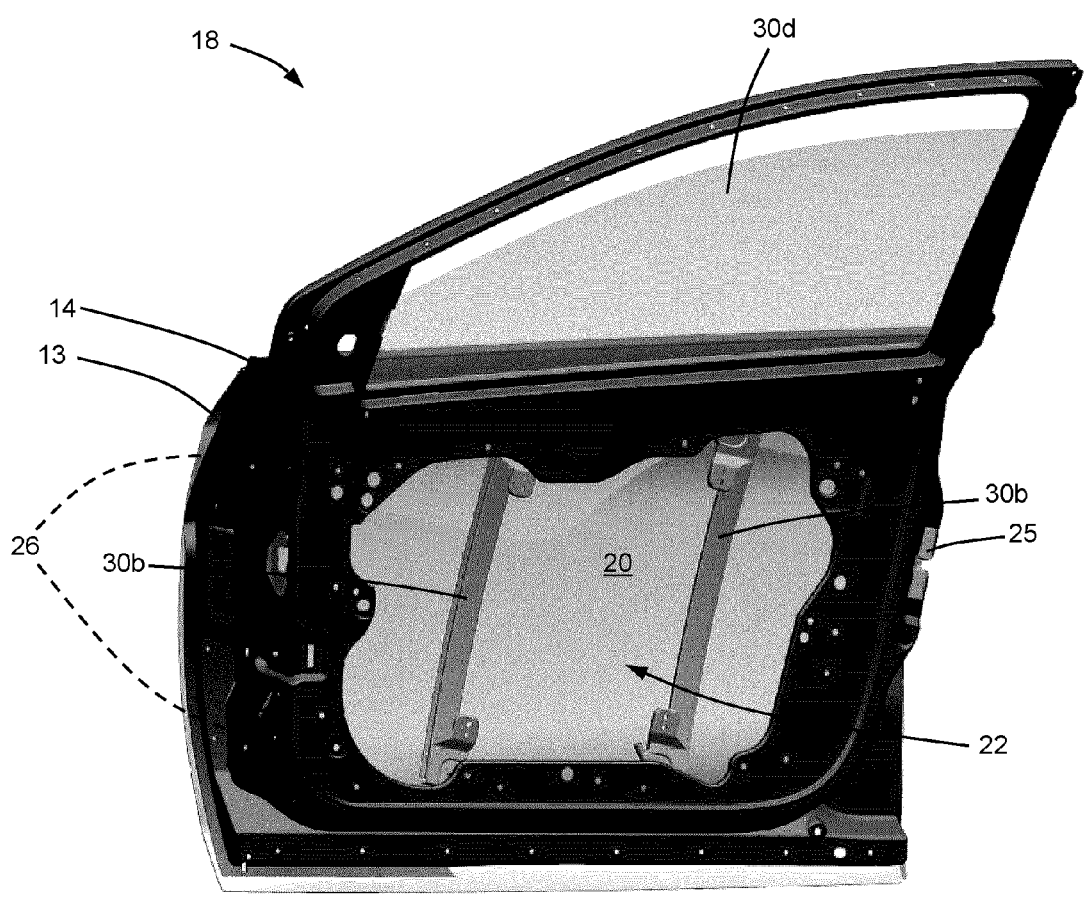
FIG. 3 is a perspective view of a door panel structure that is part of the door assembly shown in FIG. 2.

The outer panel 13 forms at least part of the exterior surface of the door assembly 10. The inner panel 14 provides a structural member for the mounting of one or more trim pieces that form an inner surface of the door assembly 10. Some of the inner panel 14 may itself also form part of the inner surface of the door assembly 10. The inner and outer panels are connected together and together form a door panel structure 18 that contains a door cavity 20 (FIG. 3). An opening 22 in the door panel structure 18 provides access to the door cavity 20.

The outer and inner panels 12 and 14 may be made from any suitable material or combination of materials. For example, the outer and inner panels 12 and 14 may both be made from a suitable metal (e.g. a suitable steel). In another example, the outer panel 13 may be made from a suitable polymeric or composite material (e.g. fiberglass) and the inner panel may be made from a suitable metal.

Figure 5B:
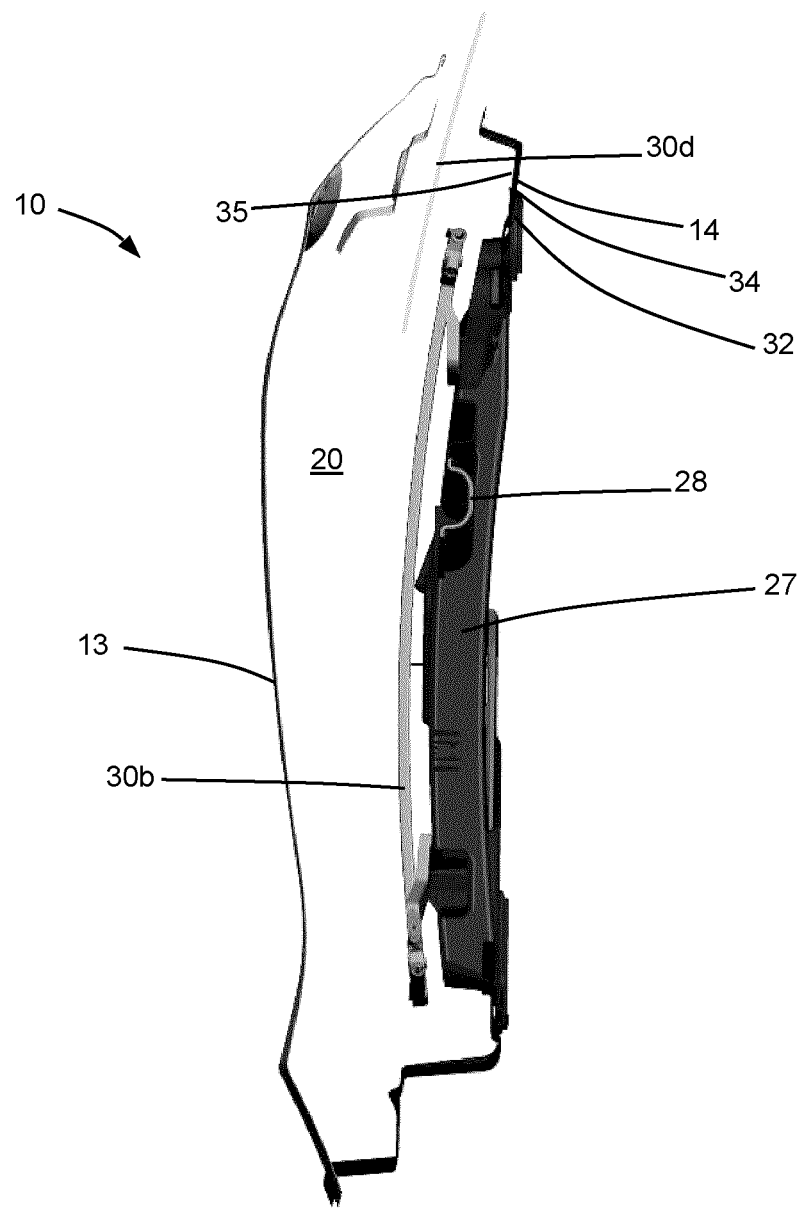
FIG. 5*b* is a sectional end view of the door assembly shown in FIG. 2.
Figure 5C:
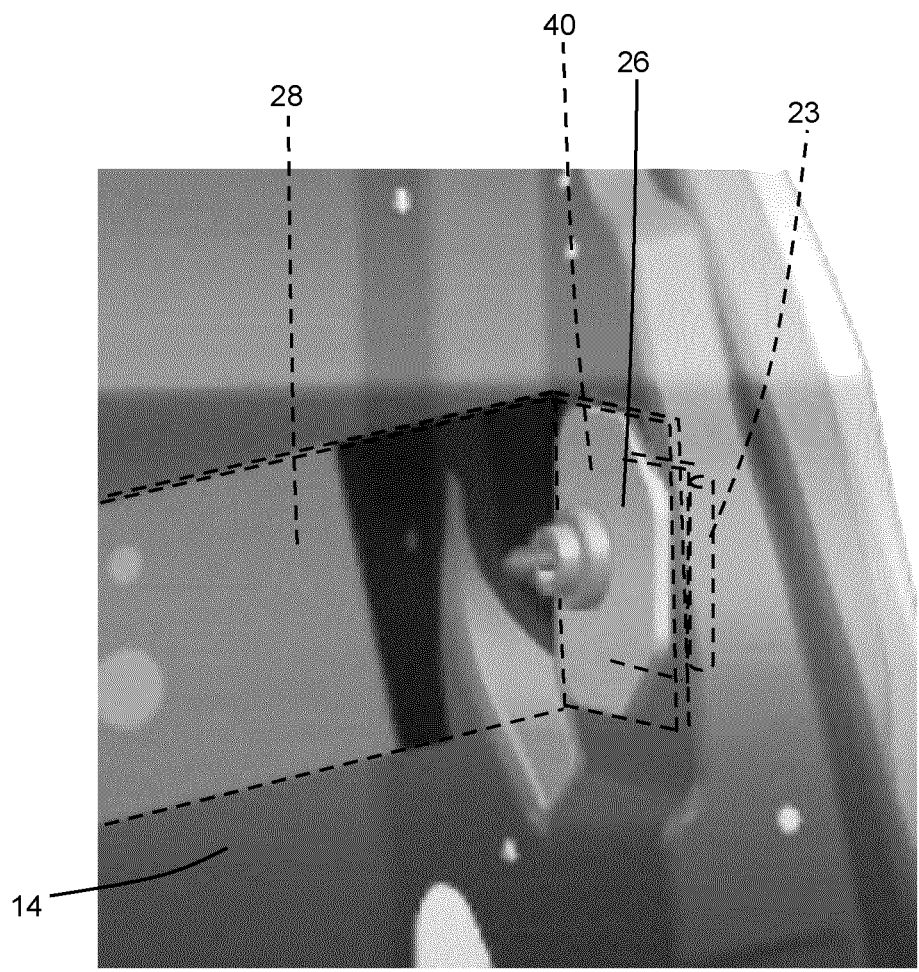
FIG. 5*c* is a magnified perspective view of a portion of the door assembly shown in FIG. 2.

A pair of hinges 23 (one of which is shown in FIG. 5*c*) are connected to the door panel structure 18 and pivotally mount the front end of the door panel structure (and the door assembly 10) to the vehicle body 11. A door latch 24 (FIG. 5*a*) mounts to the rear end of the door panel structure 18 to permit the releasable closure of the door assembly 10 against the vehicle body 11. The hinges 23 and the door latch 24 acts as force transfer members through which forces in the door assembly 10 are transmitted to the vehicle 11. Such forces include, for example, side-impact forces from a vehicle colliding with the vehicle 12.

Referring to FIG. 3, at least one of the outer and inner panels 12 and 14 includes a latch reinforcement structure 25 that engages the door latch 24 and transmits forces in the door panel structure 18 thereto for transmission out of the door assembly 10 and into the vehicle body 11. The latch reinforcement structure 25 may simply be made up of a relatively thick metal plate that supports the door latch 24. Similarly, at least one of the outer and inner panels 12 and 14 includes a hinge reinforcement structure 26 that engages the hinges 23 and transmits forces in the door panel structure 18 thereto for transmission out of the door assembly 10 and into the vehicle body 11. The hinge reinforcement structure 26 may simply be made up of one or more relatively thick metal plates that support the hinges 23. Thus, side impact forces incurred by the door assembly 10 can be transferred to the vehicle body 11 through the door latch 24 and the hinges 23.

Figure 4A:
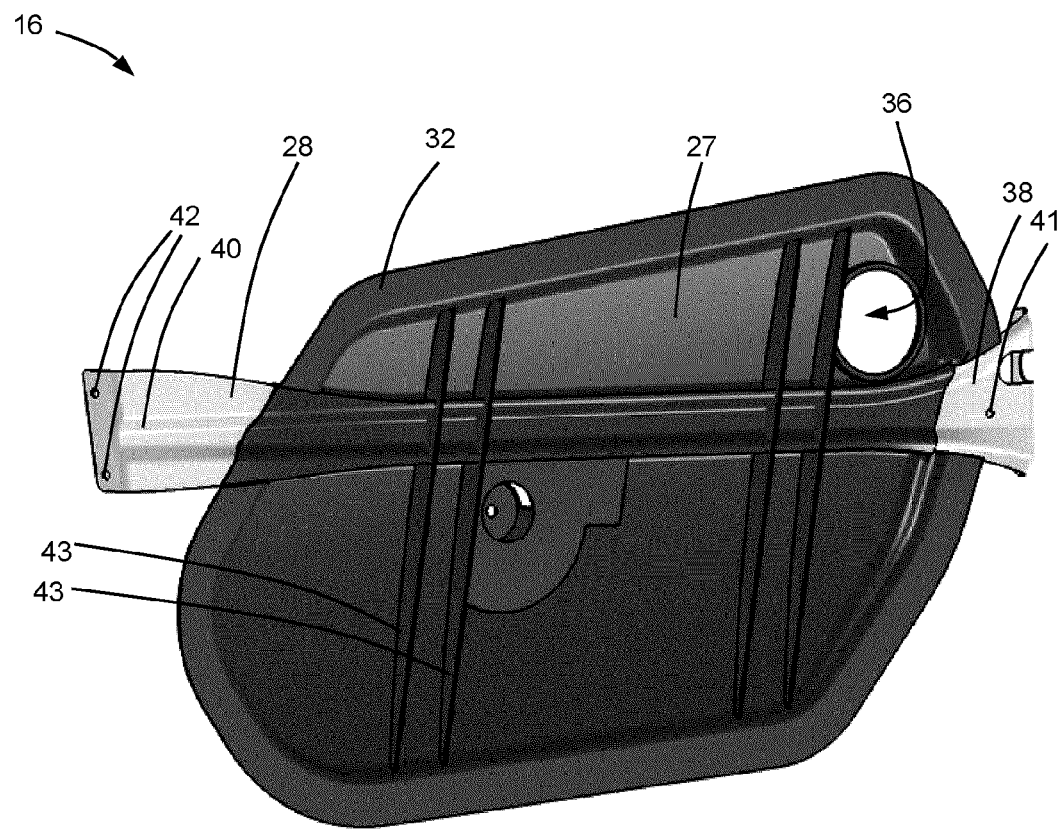
FIGS. 4*a* and 4*b* are elevation views of a carrier/intrusion member assembly that is part of the door assembly shown in FIG. 2.
Figure 4B:
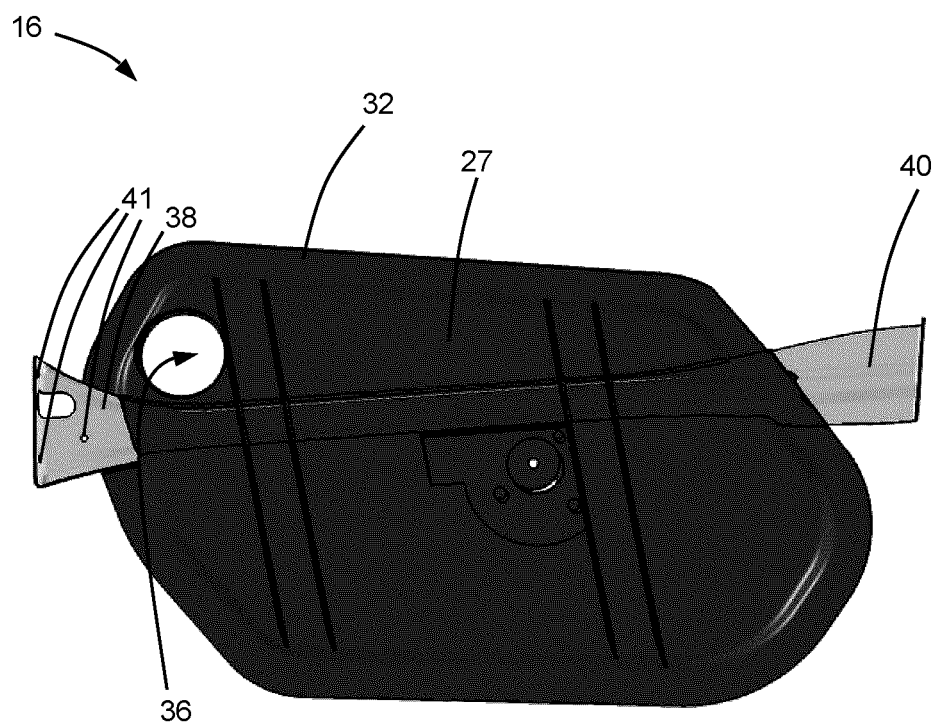

The carrier/intrusion member assembly 16 includes a carrier 27 (FIGS. 4*a* and 4*b*), an intrusion member 28 and a plurality of door hardware components 29 (FIG. 5*a*) including, for example, components from a window regulator shown at 30 (e.g. a motor driven cable drum (not shown), pulleys and cable guides (shown at 30*a*), lifter plates (not shown), window regulator rails (shown at 30*b*), and glass run channels (shown at 30*c*) for guiding the window (shown at 30*d*)). Other door hardware components 29 may include, for example, a speaker (not shown) for outputting sound from the vehicle's stereo system (not shown). The positions of the window regulator rails 30*b* are shown in FIG. 3 also.

Figure 2:
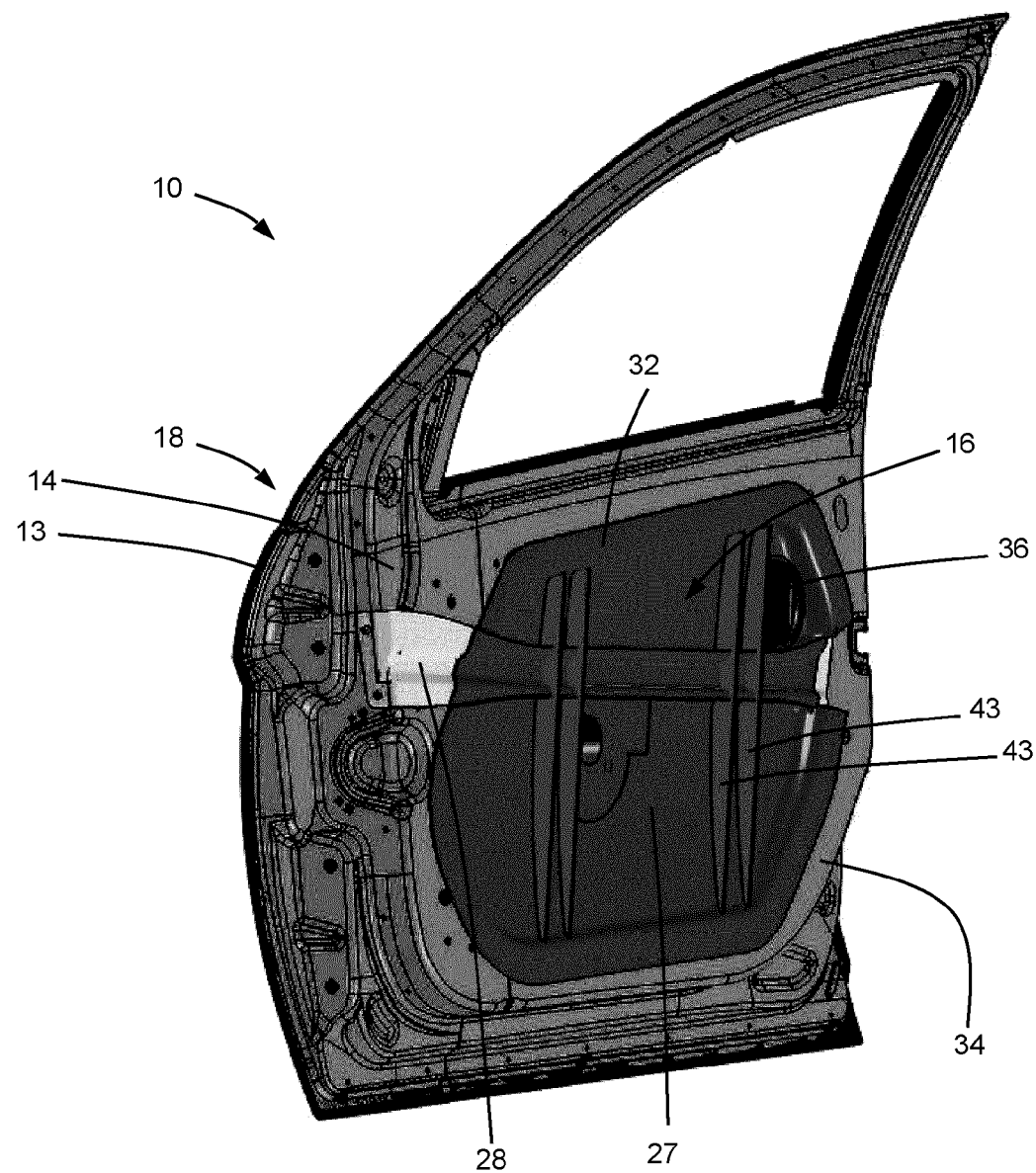
FIG. 2 is a perspective view of the door assembly shown in FIG. 1 alone.

Referring to FIG. 5*a*, the carrier 27 is a panel that holds a plurality of the aforementioned door hardware components 29 and is installing in position on the door panel structure 18 so that all of the attached door hardware components 29 are automatically in their necessary positions for operation. The carrier 27 may be made from a polymeric material or a metallic material. The carrier 27 mounts to the door panel structure 18 in such a way that the door hardware components 28 extend through the opening 22 in the door panel structure 18 into the door cavity 20. Referring to FIG. 2, the carrier 27 has a peripheral edge 32 that sealingly engages the inner panel 14 to prevent the leakage of moisture therepast. In the embodiment shown, the peripheral edge 32 engages the inner face of the inner panel 14, (shown at 34 in FIG. 5*b*), however it will be understood that the carrier 27 could alternatively mount entirely or partially to the outer face of the inner panel 14 (shown at 35 in FIG. 5*b*).

Referring to FIG. 2, the carrier 27 includes an access aperture 36 that permits access to the components 28 in the door cavity after the carrier 27 has been mounted to the door panel structure 18. After installation of components in the door cavity 20 is complete, the access aperture 36 may be closed by some suitable member to prevent moisture from leaking therepast.

The intrusion member 28 is a member that strengthens the door assembly 10, and in particular increases the resistance of the door assembly 10 to intrusion into the vehicle cabin from a side-impact (e.g. from another vehicle colliding with the vehicle 12). The intrusion member 28 may be made from any suitable material, such as a suitable metallic material.

The intrusion member 28 has a first end 38 and a second end 40. In the embodiment shown, the first and second ends 38 and 40 of the intrusion member 28 extend past the peripheral edge of the carrier 32, thereby facilitating the mounting of the intrusion member 28 directly to the door panel structure 18. This permits the intrusion member 28 to better assist the door assembly 10 in resisting deformation inwards from a side impact than if the intrusion member 28 were simply mounted to the carrier 27 only and not directly to the door panel structure 18.

In a particularly advantageous embodiment, shown in FIGS. 5*a*, 5*b* and 5*c*, the first and second ends 38 and 40 of the intrusion member 28 have first and second mounting features 41 and 42 at the first and second ends 38 and 40 are connected to (and thus engage) the latch reinforcement structure 25 and the hinge reinforcement structure 26 respectively. For this reason, the first end 38 of the intrusion member 28 may be referred to as a hinge end 38 in some embodiments, and the second end 40 may be referred to as a latch end in some embodiments. The first and second mounting features 41 and 42 may comprise one or more apertures for the pass-through of mechanical fasteners, side edge surfaces that are used for welding, a bottom surface that is used for bonding, or any other type of feature. As a result of being engaged with the latch reinforcement structure 25 and the hinge reinforcement structure 26, the intrusion member 28 transmits side-impact forces incurred by the door assembly 10 to them and therefore out of the door assembly 10 into the vehicle body 11 through them. As a result, the vehicle body 11 itself assists in resisting deformation of the door assembly 10 from a side impact.

The connection between the first and second ends 38 and 40 of the intrusion member 28 and the latch reinforcement structure 25 and the hinge reinforcement structure 26 may be by any suitable means, such as by welding, bonding, and/or by mechanical fasteners.

From an ease-of-assembly point of view, however, by providing the carrier/intrusion member assembly 16 (i.e. by providing the intrusion member 28 with the carrier 27), the installation of the carrier 27 with all of the door hardware components 29 mounted thereto is facilitated as compared to some prior art door assemblies in which the carrier assembly with the door hardware components must be installed onto a door panel structure with an intrusion member already connected to the door panel structure. It can be difficult to maneuver the carrier assembly into place without interference occurring between a pre-installed intrusion member and the door hardware components (which can in some circumstances damage some of the door hardware components).

While the carrier 27 itself mounts to the door panel structure 18 in the embodiments shown herein, it is possible in an alternative embodiment for the carrier 27 to be sufficiently solidly connected to the intrusion member 28 and to not require direct mounting to the door panel structure 18.

The connection between the carrier 27 and the intrusion member 28 may be by any suitable means. For example, in the embodiment shown in FIGS. 4a and 4b the carrier 27 is overmolded on the intrusion member 28.

By virtue of a rigid connection between the carrier 27 and the intrusion member, as is provided by overmolding, the intrusion member 28 can add rigidity to the carrier 27, so that the carrier 27 can better act as a structural component of the door assembly 10 so as to help inhibit door sag and the like.

To assist in the transfer of forces between the carrier 27 and the intrusion member 28, there may be provided a set of strengthening ribs 43 molded into the carrier 27 that extend across the intrusion member 28.

Figure 6:
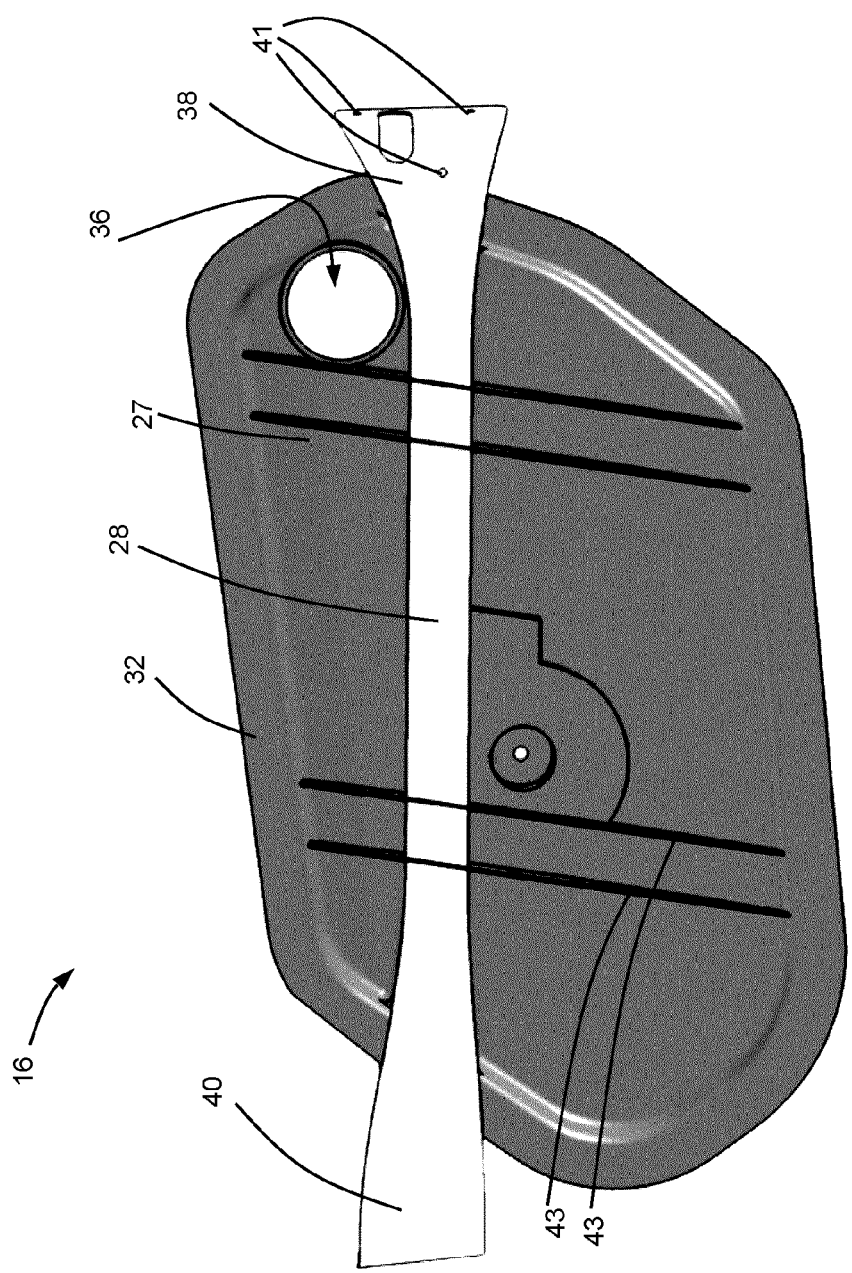
FIG. 6 is a side view of a variant of the carrier/intrusion member assembly shown in FIGS. 4*a* and 4*b*.

In other embodiments, the intrusion member 28 may connect to the carrier 27 in other ways. For example, as shown in FIG. 6, the carrier 27 may include preformed slots in the strengthening ribs 43, which permit the pass-through (e.g. from left to right), so as to loosely connect the intrusion member 28 to the carrier 27.

Figure 7:
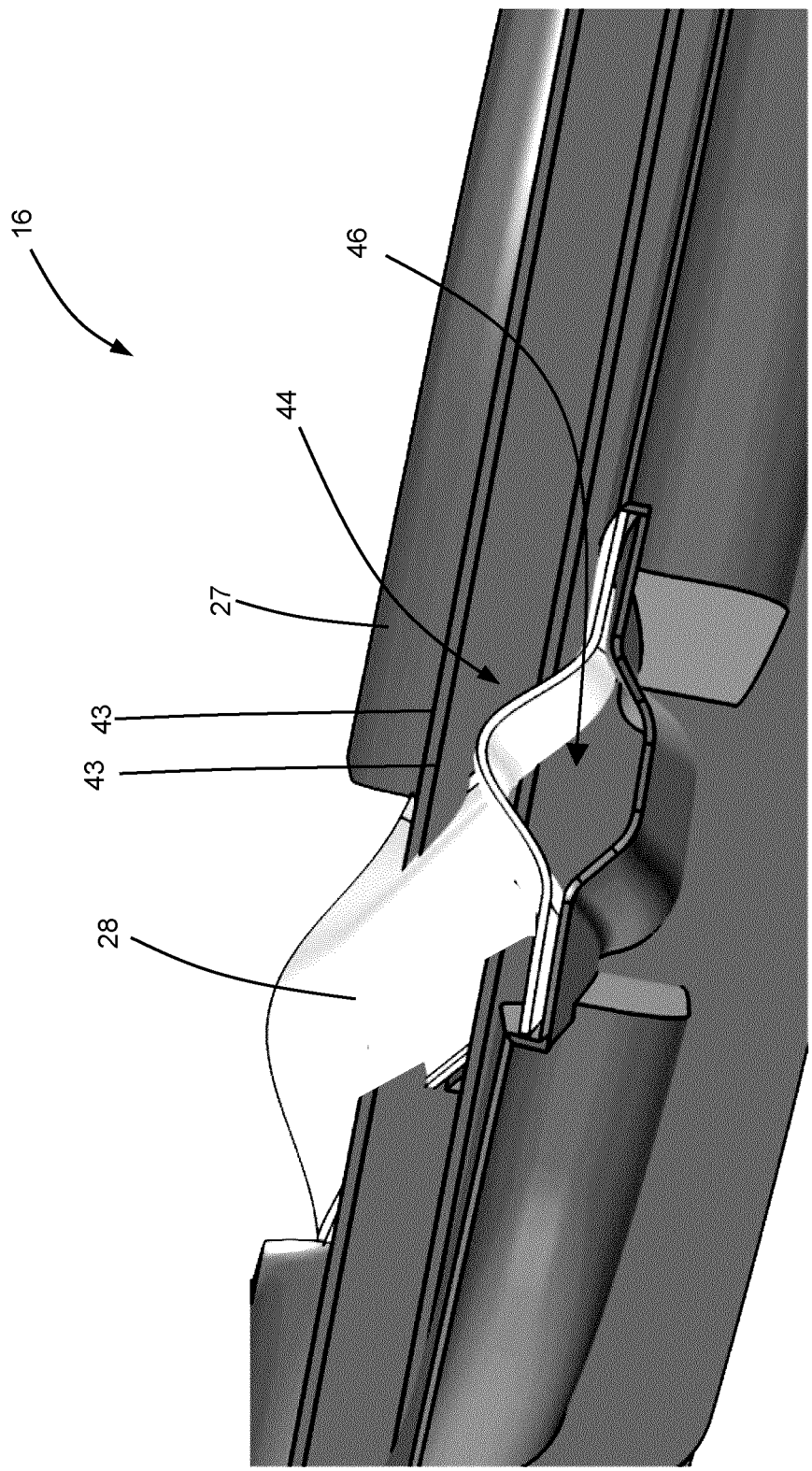
FIG. 7 is a side view of another variant of the carrier/intrusion member assembly shown in FIGS. 4*a* and 4*b*.

In yet another embodiment, the intrusion member 28 may connect to the carrier 27 by a snap-fit connection, such as is shown in FIG. 7.

In some embodiments, such as the embodiment shown in FIG. 7, the intrusion member 28 may cooperate with the carrier 27 to form a hollow structure 44 that contains a carrier/intrusion member cavity 46. By forming a hollow structure, particularly when the carrier 27 and the intrusion member 28 are connected fixedly enough to be able to transmit bending stresses to one another, the resistance to deformation of the hollow structure can be significantly higher than if the carrier 27 and intrusion member 28 are connected with no hollow structure formed therebetween.

Figure 8:
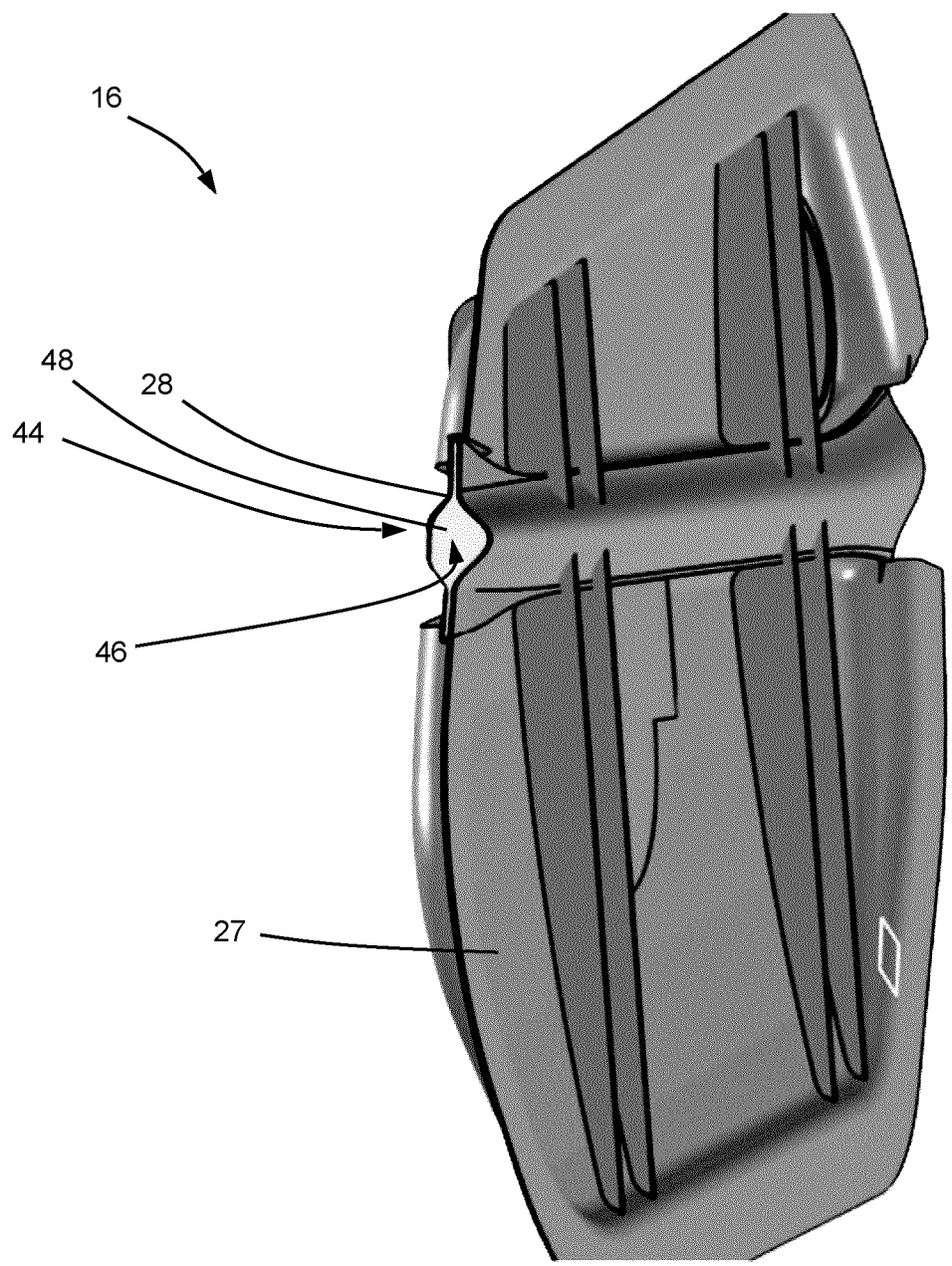

Optionally, as shown in FIG. 8, the carrier/intrusion member cavity 46 may contain (and is preferably substantially filled with) an energy absorption material 48. The energy absorption material may be any suitable type of material. For example, it may be aluminum foam, or alternatively magnesium foam or a polymeric foam. The term aluminum is meant to include both pure aluminum and aluminum alloys. Similarly, the term magnesium is intended to include both pure magnesium and magnesium alloys.

The energy absorption material 48 may be provided initially in the form of a solid, preformed member. In embodiments wherein the carrier 27 is preformed and then connected to the intrusion member 28, the solid preformed member made up of energy absorption material 48 can be inserted between the carrier 27 and the intrusion member 28 as they are being joined together. Alternatively, the energy absorption material 48 may be provided initially in the form of a flowable (e.g. molten) material that may be injected into the cavity 46 and which may be hardened, by any suitable means thereafter (e.g. by simply allowing it to cool). The energy absorption material acts to further dissipate energy from a side-impact thereby further reducing the degree of intrusion into the passenger compartment of the vehicle 12 that might occur from a side-impact. The passenger compartment is shown at 50 in FIG. 1.

Figure 9:
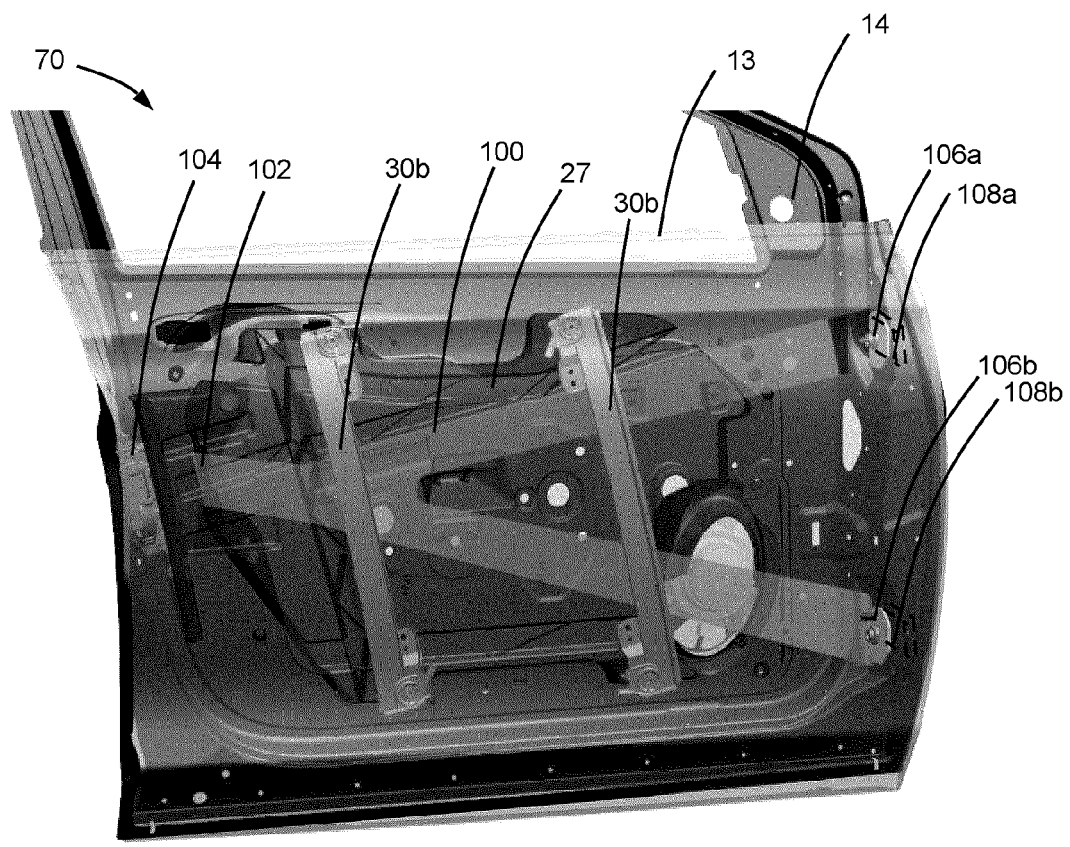
FIG. 9 shows a transparent side view of a carrier/intrusion member assembly in accordance with another embodiment of the present invention.

FIG. 9 illustrates a door assembly 70 in accordance with another embodiment of the present invention, in which the intrusion member, shown at 100, has one first end 102 that is a latch end and is connected to a latch reinforcement structure and the latch, shown at 104, and two second ends 106a and 106b that are hinge ends that connect to the hinge reinforcement structures and the hinges shown at 108a and 108b respectively.

Figure 10:
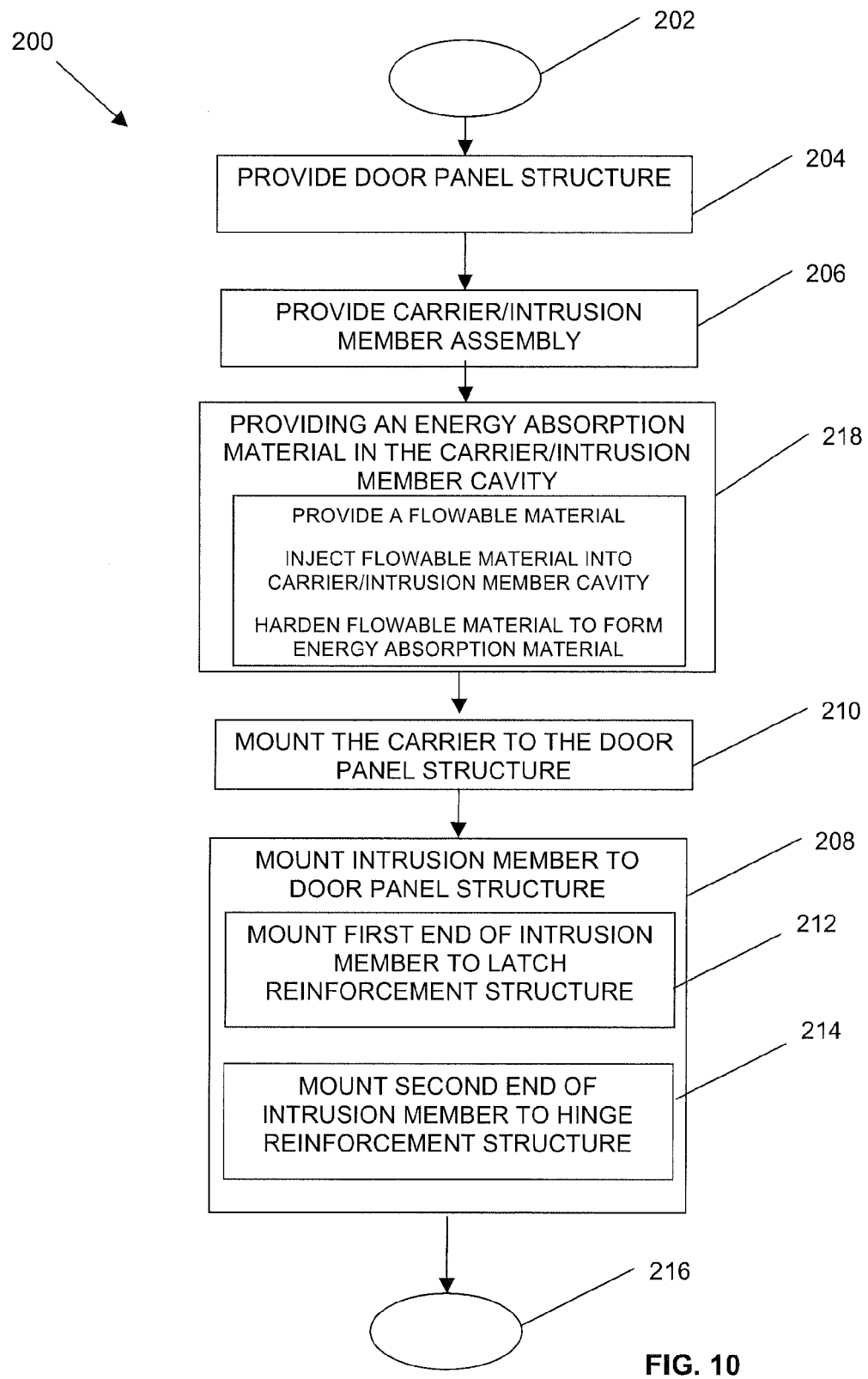
FIG. 10 is a flow diagram illustrative of a method of making a door assembly in accordance with another embodiment of the present invention.

FIG. 10 illustrates a method 200 of making the door assembly 10 in accordance with an embodiment of the present invention. The method 200 begins at 202. Step 204 includes providing a door panel structure, such as structure 18 and which includes an outer panel, such as outer panel 13 and an inner panel such as inner panel 14 connected together and together defining a door cavity, such as door cavity 20, between the inner and outer panels. Step 206 includes providing a carrier/intrusion member assembly, such as assembly 16, which includes a carrier such as carrier 27, an intrusion member (such as member 28) connected to the carrier, and a plurality of door hardware components (such as components 29 and 30) mounted to at least one of the carrier and the intrusion member. Step 208 includes mounting the carrier/intrusion member assembly to the door panel structure at least in part by mounting the intrusion member to the door panel structure. After step 208 the hardware components extend into the door cavity. The method 200 may further include step 210, which includes mounting the carrier to the door panel structure. Step 208 may optionally include step 212 which is mounting an end (i.e. a first end) of the intrusion member to the latch reinforcement structure. Alternatively or additionally, step 208 may optionally include step 214 which is mounting another end (i.e. a second end) of the intrusion member to the hinge reinforcement structure. Optionally, step 206 may include, providing the intrusion member, and overmolding the carrier over the intrusion member. The method ends at 216.

Optionally, the carrier and the intrusion member may together define a carrier/intrusion member cavity. The method 200 may further include step 218 which is providing an energy absorption material in the carrier/intrusion member cavity, which may entail providing a flowable material; injecting the flowable material into the carrier/intrusion member cavity; and hardening the flowable material to form the energy absorption material.

While the above description constitutes a plurality of embodiments of the present invention, it will be appreciated that the present invention is susceptible to further modification and change without departing from the fair meaning of the accompanying claims.

The invention claimed is:

1. A door assembly for a vehicle, comprising:
an outer panel;
an inner panel connected to the outer panel, wherein the inner and outer panels together form a door panel structure defining a door cavity between the inner and outer panels, wherein the inner panel includes a latch reinforcement structure that is connected with a door latch and is configured to transfer forces from the door panel structure to a body of the vehicle through the door latch;
an intrusion member separate from the door panel structure, the intrusion member extending across the door cavity and mounted to the door panel structure, the intrusion member having a latch end that connects to the latch reinforcement and a hinge end that connects to the door panel structure outside the door cavity; and
a plurality of door hardware components extending into the door cavity.

2. A door assembly as claimed in claim 1 further comprising:
a carrier/intrusion member assembly, including
a carrier;
the intrusion member, wherein the intrusion member is connected to the carrier; and
the plurality of door hardware components, wherein the plurality of door hardware components is mounted to at least one of the carrier and the intrusion member.

3. A door assembly as claimed in claim 2, wherein the carrier is mounted to the door panel structure.

4. A door assembly as claimed in claim 3, wherein the carrier has a peripheral edge and sealingly engages the inner panel along the peripheral edge.

5. A door assembly as claimed in claim 2, wherein the carrier has a peripheral edge and wherein the intrusion member has at least one end that extends past the peripheral edge of the carrier.

6. A door assembly as claimed in claim 2, wherein the carrier and the intrusion member together define a carrier/intrusion member cavity.

7. A door assembly as claimed in claim 6, wherein the carrier/intrusion member cavity contains an energy absorption material.

8. A door assembly as claimed in claim 7, wherein the energy absorption material is either foamed magnesium or foamed aluminum.

9. A door assembly as claimed in claim 1, wherein the inner panel includes a hinge reinforcement structure that is connected with a door hinge and is configured to transfer forces from the door panel structure to a body of the vehicle through the door hinge.

10. A door assembly as claimed in claim 1, wherein the latch end of the intrusion member connects to the latch reinforcement structure inside the door cavity.

11. A door assembly as claimed in claim 2, wherein the intrusion member is connected to the carrier by a snap fit.

12. A door assembly as claimed in claim 1, wherein the plurality of hardware components, comprising: a plurality of window regulator components.

13. A door assembly as claimed in claim 1, wherein the inner panel includes a hinge reinforcement structure that is at least indirectly connected with a door hinge and is configured to transfer forces from the door panel structure to a body of the vehicle through the door hinge, wherein a hinge end of the intrusion member connects to the hinge reinforcement structure.

14. A door assembly as claimed in claim 9, wherein the hinge end of the intrusion member connects to the hinge reinforcement structure of the door panel structure.

15. A door assembly for a motor vehicle, comprising:
an outer panel;
an inner panel connected to the outer panel, wherein the inner and outer panels together form a door panel structure defining a door cavity between the inner and outer panels;
a carrier/intrusion member assembly including a carrier and an intrusion member, the intrusion member being connected to the carrier and separate from the door panel structure, the intrusion member extending across the door cavity and mounted to the door panel structure, wherein the carrier is made from a polymeric material and the intrusion member is made from a metallic material; and
a plurality of door hardware components extending into the door cavity, wherein the plurality of door hardware components is mounted to at least one of the carrier and the intrusion member.

16. A door assembly for a motor vehicle, comprising:
an outer panel;
an inner panel connected to the outer panel, wherein the inner and outer panels together form a door panel structure defining a door cavity between the inner and outer panels;
a carrier/intrusion member assembly including a carrier and an intrusion member, the intrusion member being connected to the carrier and separate from the door panel structure, the intrusion member extending across the door cavity and mounted to the door panel structure, wherein the carrier is overmolded on the intrusion member; and
a plurality of door hardware components extending into the door cavity, wherein the plurality of door hardware components is mounted to at least one of the carrier and the intrusion member.

17. A door assembly for a vehicle, comprising:
a door panel structure including an outer panel and an inner panel connected to the outer panel, wherein the inner and outer panels define a door cavity therebetween, and the inner panel defines an opening to the door cavity; and
a carrier/intrusion member assembly including a carrier and an intrusion member, the carrier closing the opening to the door cavity and presenting a peripheral edge, the intrusion member extending across the carrier and beyond the peripheral edge of the carrier along an inner face of the inner panel, and the intrusion member being mounted to the inner panel.

18. A door assembly as claimed in claim 17, wherein the peripheral edge of the carrier sealingly engages the inner face of the inner panel.

19. A door assembly as claimed in claim 17, wherein the inner panel includes a hinge reinforcement structure and a latch reinforcement structure, a hinge end of the intrusion member is connected to the hinge reinforcement structure, and a latch end of the intrusion member is connected to the latch reinforcement structure.

20. A door assembly as claimed in claim 17 including a plurality of hardware components mounted to at least one of the carrier and the intrusion member.

21. A door assembly as claimed in claim 20, wherein the door hardware components extend into the door cavity.

* * * * *